(12) United States Patent
Parris et al.

(10) Patent No.: US 6,529,663 B1
(45) Date of Patent: Mar. 4, 2003

(54) SELF-SUPPORTING FIBER OPTIC CABLE HAVING A SUPPORT SECTION WITH A NON-UNIFORM JACKET

(75) Inventors: Donald R. Parris, Newton, NC (US); Michael J. Gimblet, Hickory, NC (US); Christopher M. Quinn, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 122 days.

(21) Appl. No.: 09/628,835

(22) Filed: Jul. 31, 2000

(51) Int. Cl.$^7$ ................................................. G02B 6/44
(52) U.S. Cl. ..................................................... 385/113
(58) Field of Search ................................ 385/100, 101, 385/102, 103, 104, 105, 106, 107, 108, 109, 110, 111, 112, 113

(56) References Cited

U.S. PATENT DOCUMENTS

| | | | |
|---|---|---|---|
| 4,662,712 A | | 5/1987 | Tabata et al. ............ 350/96.23 |
| 4,763,983 A | * | 8/1988 | Keith ....................... 350/96.23 |
| 4,856,867 A | | 8/1989 | Gaylin .................... 350/96.23 |
| 4,883,671 A | * | 11/1989 | Onodera et al. ............ 425/122 |
| 5,777,260 A | * | 7/1998 | Klumos et al. ............... 174/24 |
| 5,920,672 A | * | 7/1999 | White ........................ 385/110 |
| 5,978,537 A | * | 11/1999 | Hosoi et al. ................ 385/112 |
| 6,188,821 B1 | * | 2/2001 | McAlpine et al. .......... 385/100 |

* cited by examiner

*Primary Examiner*—Javaid Nasri
(74) *Attorney, Agent, or Firm*—Timothy J. Aberle

(57) ABSTRACT

An improved self-supporting fiber optic cable is provided that includes a cable section having at least one optical fiber and a jacket surrounding the at least one optical fiber, and a support section having at least one strength member extending in a lengthwise direction and an overlying jacket that includes a number of jacket segments spaced lengthwise along the at least one strength member. As a result of the lengthwise spacing of the jacket segments, portions of the at least one strength member are at least partially exposed. The jackets of the cable and support sections are connected, such as by an intermittent web. A method for manufacturing a fiber optic cable having a support section with an intermittent or semi-intermittent jacket is also provided which relies upon the periodic extrusion of extrudate about the at least one strength member to form the jacket segments that are spaced apart in a lengthwise direction along the at least one strength member. Alternatively, a thin coating of jacket material can exist between jacket segments.

14 Claims, 3 Drawing Sheets

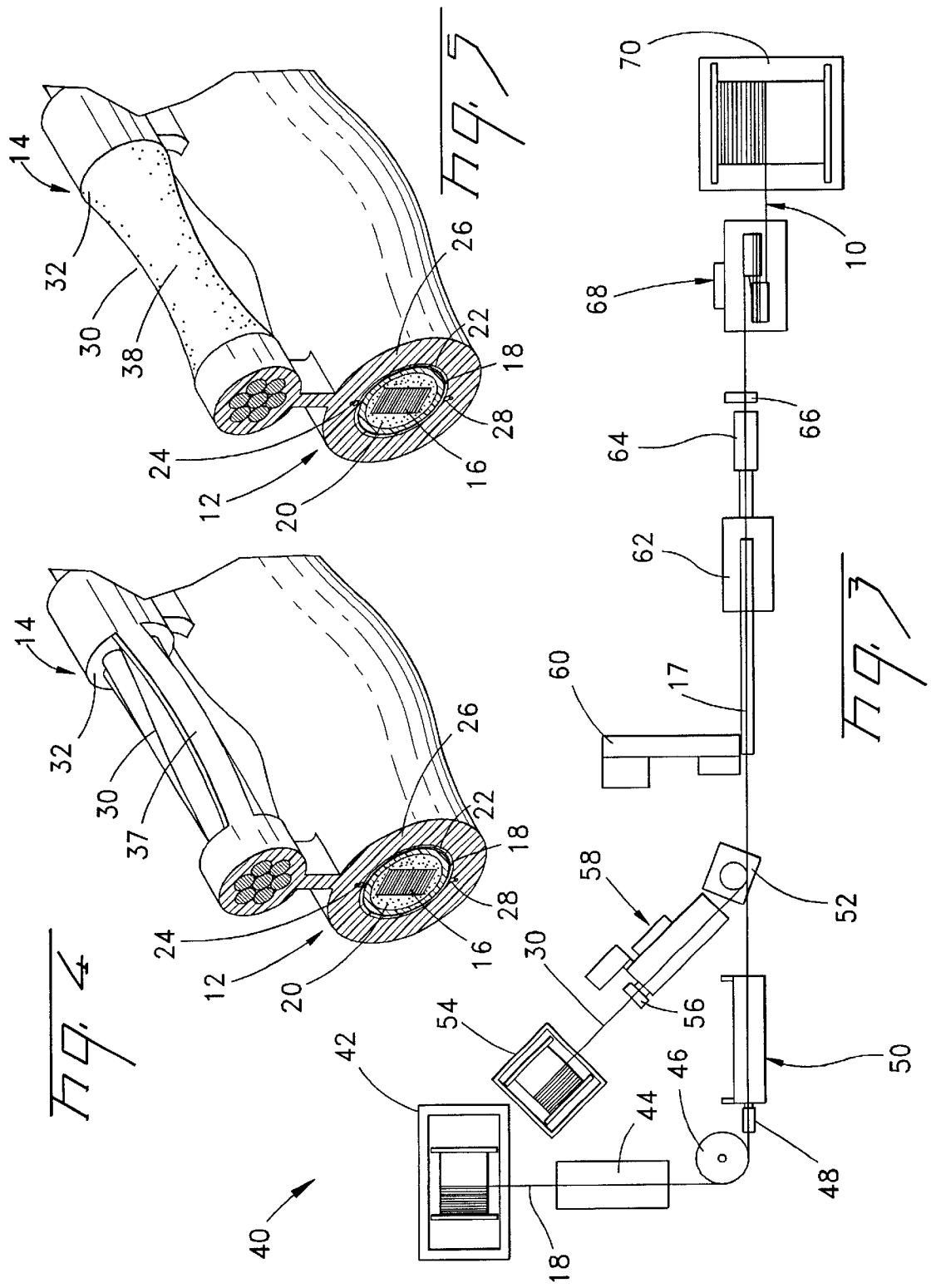

SELF-SUPPORTING FIBER OPTIC CABLE HAVING A SUPPORT SECTION WITH A NON-UNIFORM JACKET

FIELD OF THE INVENTION

The present invention relates generally to self-supporting fiber optic cables and, more particularly, to self-supporting fiber optic cables having support and cable sections.

BACKGROUND OF THE INVENTION

Fiber optic cables can be employed in a variety of applications including the transmission of voice, video and data in cable television, computer and telephone systems. Regardless of the application, fiber optic cables are typically installed either in conduits that are disposed within the ground, or aerially by being strung between utility poles or the like. Of the aerially installed fiber optic cables, self-supporting fiber optic cables are advantageous since self-supporting fiber optic cables include both optical fibers as well as the support member for providing mechanical support for the aerially installed cable.

Self-supporting fiber optic cables typically include a support section for supporting the fiber optic cable and a cable section that includes optical fibers, or a combination of optical fibers and electrical conductors. While self-supporting fiber optic cables have been designed that have various profiles, one type of self-supporting fiber optic cable is a "Figure 8" configuration. As its name suggests, a "Figure 8"self-supporting fiber optic cable includes a pair of lobes connected by a web, wherein the support section forms one of the lobes and the cable section forms the other lobe.

The cable section of a conventional self-supporting fiber optic cable includes one or more buffer tubes in which the optical fibers, or a combination of optical fibers and electrical conductors, are disposed. In addition, the cable section can include one or more lengthwise extending strength members. For example, the cable section can include a plurality of buffer tubes helically stranded about a central strength member so as to define an SZ pattern or the like. Alternatively, the cable section can be of a monotube design having a single buffer tube and one or, more typically, a pair of strength members extending lengthwise along opposite sides of the buffer tube. In either design, the cable section also includes a jacket surrounding the buffer tubes and the strength members for protecting the cable components from environmental degradation and the like.

The support section of a conventional self-supporting fiber optic cable includes at least one and, more commonly, a plurality of strength members. For example, a support section can include a plurality of helically wound wires, such as galvanized steel wires. Like the cable section, the support section also includes a continuous jacket that surrounds the strength members along their entire length for protecting the strength members from environmental degradation and the like. In order to prevent water migration through the support section that could corrode the strength members, the strength members are generally asphalt flooded or are otherwise treated to prevent water migration.

The web connects the jackets of the support section and the cable section. The web typically extends continuously along the length of the fiber optic cable in the same fashion that the jackets of the support section and the cable section extend continuously along the length of the fiber optic cable. However, fiber optic cables have been designed that include an intermittent web that only connects the support and cable sections at discrete points along the length of the fiber optic cable. Among other things, an intermittent web permits the cable section to flex or bend relative to the support section, such as in instances in which the cable section is designed to have an overlength with respect to the support section in order to accommodate some elongation of the support section in response to tensile forces placed upon the cable without subjecting the optical fibers of the cable section to the tensile forces. In addition, an intermittent web permits at least some wind to pass through the windows defined between adjacent web segments in order to decrease the wind loading otherwise experienced by the fiber optic cable. Still further, an intermittent web decreases the weight of the fiber optic cable. Since the weight of a fiber optic cable contributes to the tensile forces experienced by an aerially installed fiber optic cable, any decrease in the weight of a fiber optic cable is advantageous. In any event, the web is generally extruded concurrent with the extrusion of the jackets of the support section and the cable section such that the web, albeit a continuous web or an intermittent web, is integral with the jackets of the support section and the cable section.

Even in instances in which a self-supporting fiber optic cable includes an intermittent web, the jackets of the support section and the cable section are continuous in order to protect the strength members and the optical fibers from environmental degradation and the like. During installation of a self-supporting fiber optic cable, however, the jacket of the support section must sometimes be removed from those portions of the fiber optic cable proximate a point of attachment to permit the strength members of the support section to be securely gripped. For example, during installations in which a fiber optic cable is going to turn around a comer or otherwise be redirected, the strength members of the support section are typically connected to a utility pole at or near the comer by means of a preform or some other type of connector hardware. In order to securely grip the strength members of the support section, the jacket surrounding the strength members is typically removed from that portion of the strength members that will be gripped by the preform or other connector hardware. As will be apparent, the time and labor required to strip the jacket from the portion of the support section that will be attached to a utility pole or the like increases the time required for installation and the resulting cost of the self-supporting fiber optic cable. With the ever increasing demands to reduce the cost of fiber optic cable, any increase in the material or installation costs of the fiber optic cable is particularly disadvantageous.

SUMMARY OF THE INVENTION

An improved self-supporting fiber optic cable is therefore provided for aerial applications. The fiber optic cable includes a cable section comprising at least one optical fiber and a jacket surrounding the at least one optical fiber; and a support section comprising at least one strength member extending in a lengthwise direction and a jacket surrounding portions of the at least one strength member and connected to the jacket of the cable section by webs, wherein the jacket of the support section comprises a plurality of jacket segments spaced lengthwise along the at least one strength member. Preferably, the jacket segments are monolithically formed with the webs and the segments are separated by wholly or at least partially exposed portions of the strength member. Moreover, the segments can be connected to other segments by a thin coating between the segments monolithically formed with the segments.

In another aspect of the present invention, a fiber optic cable includes a cable section including at least one optical fiber and a jacket surrounding the at least one optical fiber; a support section including at least one strength member and a jacket surrounding portions of the at least one strength member; and a web connecting the respective jackets of the cable section and the support section, wherein the web and the jacket of the support section have a plurality of web and jacket segments, respectively, disposed in a spaced relationship. As such, portions of the at least one strength member are wholly or partially exposed between the plurality of jacket segments.

In preferred embodiments, each pair of adjacent jacket segments are spaced apart by a distance greater than the length of either jacket segment taken in a lengthwise direction, thereby reducing the material cost and the weight of the fiber optic cable of the present invention in comparison to a comparable fiber optic cable of conventional design having a support section with a continuous jacket having a constant thickness or outside diameter. Since a substantial portion of the strength members of the support section can be wholly or at least partially exposed or thinly coated between adjacent jacket segments, the jacket of the support section will likely not have to be removed as frequently during installation since those portions of the strength members that are already exposed can be gripped without removing the jacket segments. Where the support wire is wholly or partially exposed, however, the strength members are preferably comprised of a material, such as galvanized steel, that is environmentally stable, e.g., corrosion resistant.

According to another aspect of the present invention, a method of manufacturing a fiber optic cable is disclosed that provides at least one optical fiber and at least one strength member, and that extrudes jackets thereabout to define a cable section including the at least one optical fiber and a support section including the at least one strength member, wherein the extrusion of the jacket about the at least one strength member is controlled to define a plurality of jacket segments spaced apart along the at least one strength member such that portions of the at least one strength member are wholly or partially, or thinly coated, exposed between the plurality of jacket segments.

BRIEF DESCRIPTION OF THE DRAWINGS

FIG. 3 is a schematic representation of a manufacturing line for fabricating a fiber optic cable according to an embodiment of the present invention.

FIG. 4 is an isometric view of another embodiment of the present invention.

FIG. 5 is an isometric view of yet another embodiment of the present invention.

DETAILED DESCRIPTION OF THE INVENTION

Figure 1:
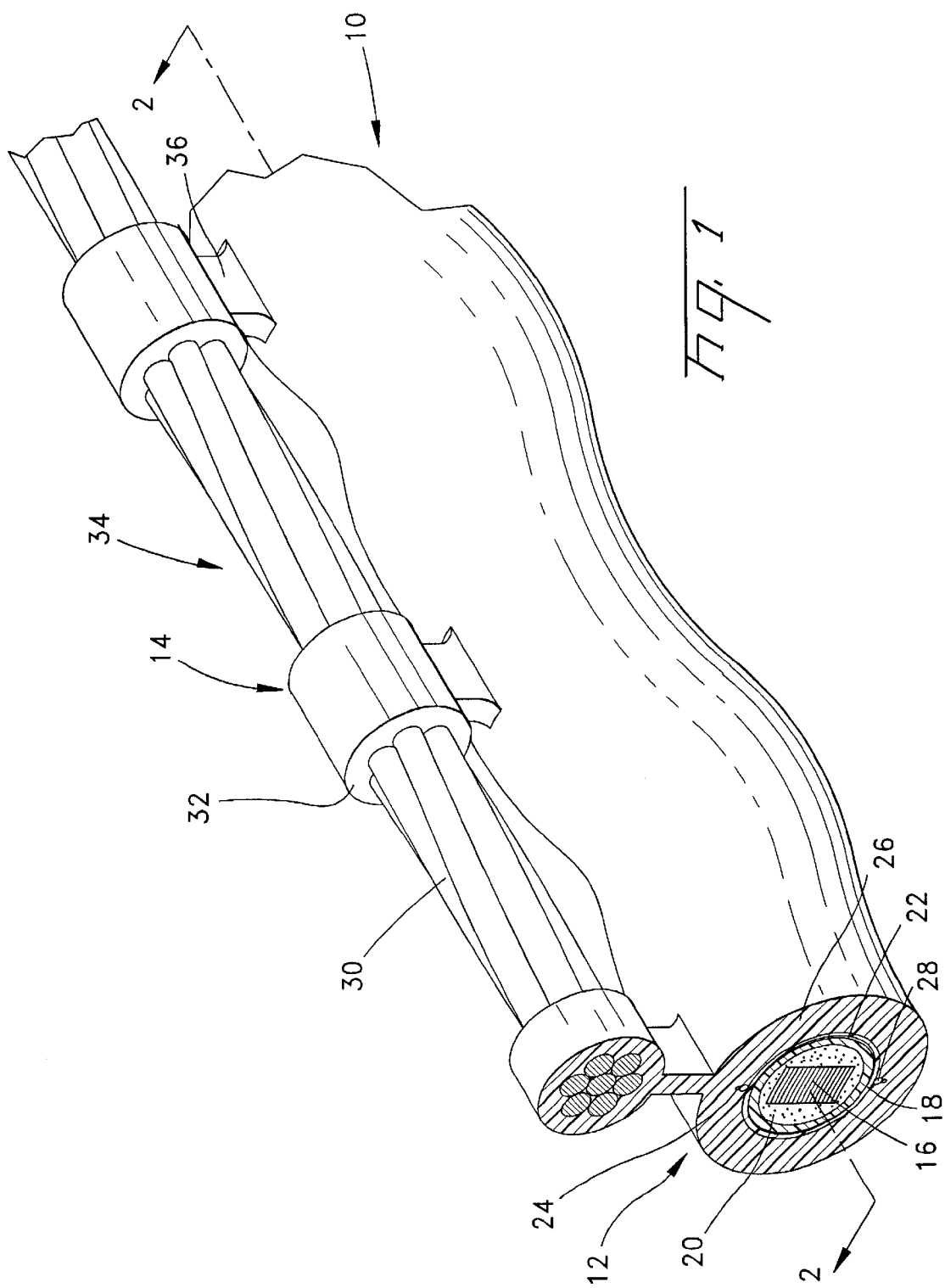
FIG. 1 is a fragmentary isometric view of a fiber optic cable according to one advantageous embodiment of the present invention.
Figure 2:
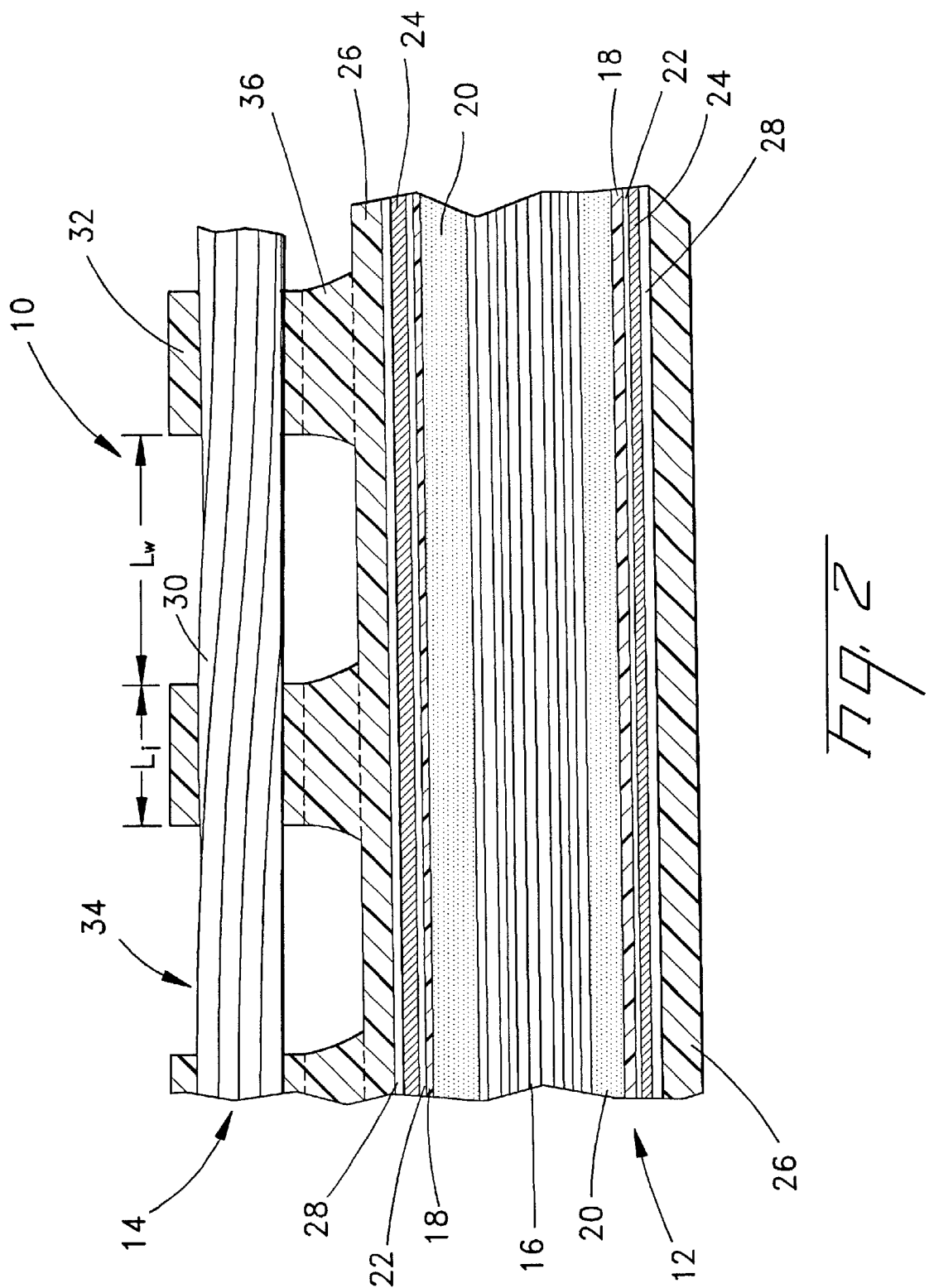
FIG. 2 is cross-sectional view of the fiber optic cable of FIG. 1 taken along line 2—2.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. Referring now to FIGS. 1 and 2, a fiber optic cable 10 according to a first embodiment of the present invention is illustrated. In a preferred embodiment fiber optic cable is 10 a self-supporting fiber optic cable that is particularly advantageous for aerial applications in which the fiber optic cable is strung between utility poles or the like. The fiber optic cable of the illustrated embodiment preferably has a "Figure 8" configuration as best seen in FIG. 1. In this regard, the fiber optic cable includes cable and support sections 12, 14 that define respective lobes of the "Figure 8" cable.

The cable section 12 extends longitudinally and includes at least one and, more preferably, a plurality of optical fibers 16. In embodiments in which cable 10 is a hybrid cable, cable section 12 includes not only optical fibers 16, but also one or more electrical conductors. Each optical fiber 16 generally includes a silica-based core that is operative to transmit light and is surrounded by a silica-based cladding having a lower index of refraction than the core. A soft primary coating surrounds the cladding, and a relatively rigid secondary coating surrounds the primary coating. Optical fibers 16 can be, for example, single-mode or multi-mode optical fibers made commercially available by Coming Inc. Optical fibers 16 can be arranged in one or more ribbons as depicted in FIGS. 1 and 2 or, alternatively, optical fibers 16 can be arranged in bundles or in a loose, unbundled form.

Cable section 12 also generally includes at least one buffer tube 18 in which optical fibers 16 are disposed. Buffer tube 18 is preferably formed of a polyolefin, for example, polyethylene or polypropylene, although buffer tube 18 can be formed of other materials, if so desired. As shown in FIGS. 1 and 2, for example, cable section 12 can include a single buffer tube that is centrally disposed therewithin such that cable section 12 can be described as having a monotube construction. According to the present invention, however, cable section 12 can have other designs. For example, cable section 12 can include a plurality of buffer tubes, each of which includes one or more optical fibers. In this embodiment, buffer tubes 18 would typically be wound in a helical fashion, such as in an SZ pattern or the like.

In order to inhibit water that might infiltrate buffer tubes 18 from reaching optical fibers 16, cable section 12 can also include a water blocking substance 20 disposed within buffer tubes 18 and around optical fibers 16. For example, water blocking substance 20 can be a superabsorbant polymer that can be incorporated into water swellable yarns and/or water swellable tapes. Alternatively or additionally, cable section 12 can include a filling compound, such as hydrophobic grease or gel, to fill the passageway defined by buffer tubes 18 and to surround optical fibers 16. In order to further protect optical fibers 16 from the infiltration of water, cable section 12 can include a water blocking tape 22 that surrounds buffer tubes 18. For example, water blocking tape 22 can be longitudinally wrapped about buffer tubes 18. While water blocking tape 22 can be formed of various materials, water blocking. tape 22 of one embodiment is a nonwoven tape impregnated with superabsorbant polymers. As such, fiber optic cable 10 of the present invention effectively protects optical fibers 16 from water infiltration and migration. In addition to water blocking tape 22, cable section 12 can also include a protective layer, such as a corrugated tape armor (not shown), wrapped about buffer tubes 18. Such tape armor can significantly enhance the ruggedness of cable section 12.

Cable section 12 can also include at least one lengthwise extending strength member 24. In the illustrated embodiment, for example, cable section 12 includes a pair of diametrically opposed strength members that extend longitudinally along opposite sides of buffer tube 18. In this regard, strength members 24 are preferably positioned in a reference plane that extends through support section 14 and cable section 12 and, more particularly, through the longitudinal axes defined by both support section 14 and cable section 12. As such, at least one strength member 24 of this embodiment is disposed between buffer tube 18 and support section 14, while the other strength member is disposed on the diametrically opposed side of buffer tube 18. Alternatively, in the embodiment that includes a plurality of buffer tubes, buffer tubes 18 can be helically wound about a lengthwise extending strength member. In either embodiment, strength members 24 can be formed of various materials including steel or other metals, glass reinforced plastic (GRP) or aramid reinforced plastic (ARP).

Cable section 12 also includes a jacket 26 surrounding the other components of cable section 12, including buffer tubes 18 and strength members 24. Typically, jacket 26 of cable section 12 is formed of polyethylene, although jacket 26 can be formed of other materials if so desired. Jacket 26 generally has a circular shape as shown in FIG. 1. However, jacket 26 can have a noncircular shape if desired. Although not necessary for the practice of the present invention, cable section 12 can also include one or more rip cords 28 that extend lengthwise along respective strength members 24. By pulling the rip cords in both a radially outward and a longitudinal direction, rip cords 28 can sever or otherwise separate jacket 26 of cable section 12 in order to expose strength members 24 and buffer tubes 18.

Although cable section 12 of fiber optic cable 10 has been illustrated and described heretofore as including at least one buffer tube 18 for containing optical fibers 16, cable section 12 may be designed so as not to include a buffer tube. In this embodiment, jacket 26 could be formed so as to define a lengthwise extending passageway through which optical fibers 16 extend. The passageway defined by jacket 26 of this embodiment could also include water-swellable elements and/or filling compounds, if desired.

Support section 14 also extends longitudinally and includes at least one and, more typically, a plurality of metallic or dielectric strength members 30. Support section 14 also includes a jacket 32 that is preferably formed of the same material that forms jacket 26 of cable section 12, such as polyethylene. Jacket 32 can be intermittently formed (FIG. 1), or continuously formed. (FIGS. 4–5). However, jacket 32 can be formed of a different material, such as a polyethylene, having a different molecular weight than the polyethylene that forms jacket 26 of cable section 12 in order to specifically tailor the mechanical properties of jacket 32. Jacket 32 generally has a circular shape, although jacket 32 can have a noncircular shape, if so desired.

In the embodiment of FIG. 1, jacket 32 of support section 14 is not continuous along the length of fiber optic cable 10. Instead, jacket 32 consists of a plurality of jacket segments spaced lengthwise along strength members 30, such that portions of strength members 30 are exposed between the plurality of jacket segments (FIGS. 1–2). In the embodiment of FIG. 4, the jacket segments are connected by at least one connecting section 37, and in the embodiment of FIG. 5 the jacket segments are connected by a relatively thin coating 38 of jacketing material. The jacket segments can be tapered and have different configurations. Since portions of strength members 30 are exposed between the plurality of jacket segments, strength members 30 are preferably formed of a material that is environmentally stable. For example, strength members 30 can include a plurality of lengthwise extending wires formed of a galvanized metal. In this regard, strength members 30 may include galvanized steel wires and, more particularly, steel wires coated zinc or a zinc-aluminum alloy in order to withstand the environmental conditions that fiber optic cable 10 will experience during service. Since strength members 30 are not completely encapsulated by jacket 32 along the entire length of cable 10, however, strength members 30 need not be treated so as to prevent or reduce water migration through jacket 32 of support section 14. Thus, strength members 30 need not be asphalt flooded in the same manner as the strength members of conventional self-supporting fiber optic cables, thereby decreasing the cost of fiber optic cable 10 of the present invention relative to a comparable fiber optic cable of conventional design. Asphalt flooding is preferred where jacket 32 is continuous.

Moreover, since a substantial portion of strength members 30 of support section 14 can be exposed between adjacent jacket segments, jacket 32 of support section 14 will likely not have to be removed as frequently during installation since those portions of strength members 30 that are already exposed can be gripped without removing the jacket segments. In addition, even in instances in which one or more jacket segments must be removed to expose an even longer span of strength members 30, the spacing of jacket segments 32 provide entry points for a tool used for stripping or otherwise removing one or more jacket segments. Thus, the time and corresponding labor costs required to install fiber optic cable 10 is preferably reduced relative to conventional fiber optic cables having a support section with a continuous jacket.

As depicted in FIGS. 1 and 2, each pair of adjacent jacket segments 32 defines a window 34 therebetween through which strength members 30 are exposed. Fiber optic cable 10 can be designed such that jacket segments 32 have different lengths when measured in a lengthwise direction. Likewise, fiber optic cable 10 can be designed such that windows 34 have different lengths when measured in a lengthwise direction. As best illustrated in FIG. 2, however, fiber optic cable 10 preferably includes a plurality of jacket segments that each have generally the same length $L_j$ and defines a plurality of windows between respective pairs of adjacent jacket segments that each have generally the same length $L_w$. Moreover, fiber optic cable 10 can be designed such that the respective lengths of jacket segments 32 and windows 34 that are defined between respective pairs of adjacent jacket segments define any ratio that is desired for the particular application.

The length $L_j$ of each jacket segment is preferably minimized and correspondingly the length $L_w$ of each window is preferably maximized in order to reduce the material cost and the weight of fiber optic cable 10. In this regard, the length $L_j$ of each jacket segment is preferably less than the length $L_w$ of each window. For example, fiber optic cable 10 of one embodiment is designed such that the ratio of the length $L_w$ of each window to the length $L_j$ of each jacket segment is at least 10:1. However, the extent to which the length $L_j$ of each jacket segment can be reduced and the length $L_w$ of each window can be increased can be limited by the specifications or requirements for fiber optic cable 10 since reductions in the length $L_j$ of each jacket segment and corresponding increases in the length $L_w$ of each window cause the. mechanical strength of the connection between cable section 12 and support section 14 to be weakened. In this regard, the respective lengths of jacket segments 32 and windows 34 are typically selected such that cable section 12 is connected to support section 14 with sufficient strength that the anticipated loading of fiber optic cable 10 will not cause cable section 12 and support section 14 to separate. By way of example and not necessarily of limitation, one embodiment of fiber optic cable 10 that is designed to withstand the loading anticipated during an aerial installation therefore includes jacket segments that each have a length $L_j$ of 5.5 centimeters and that are separated by windows that each have a length $L_w$ of 57 centimeters.

Jacket 26 of cable section 12 and jacket segments 32 of support section 14 are connected. Fiber optic cable 10 may be designed such that cable section 12 and support section 14 are immediately adjacent one another and jacket segments 32 of support section 14 are directly connected to and extend outwardly from jacket 26 of cable section 12. Typically, however, fiber optic cable 10 also includes a web 36 connecting support section 14 and cable section 12.

Web 36 is generally formed of the same material, such as polyethylene, that forms jackets 32, 26 of cable and support sections 12, 14, respectively. However, web 36 can be formed of a different material, such as a polyethylene having a different molecular weight than the polyethylene that forms jackets 32, 26 of cable and support sections 12, 14, respectively, in order to specifically tailor the mechanical properties of web 36. Although web 36 can be continuous along the length of fiber optic cable 10, web 36 preferably comprises a plurality of intermittent web segments as depicted in FIGS. 1 and 2. In this regard, the plurality of intermittent web segments connect support section 14 and cable section 12 at discrete points along the length of fiber optic cable 10, but otherwise permit support section 14 and cable section 12 to be spaced apart from one another in the regions between the web segments.

In order to connect jacket 26 of cable section 12 with jacket segments 32 of support section 14, web segments 36 are preferably connected to respective jacket segments 32. While fiber optic cable 10 could be designed such that jacket segments 32 and web segments 36 have somewhat different lengths, fiber optic cable 10 is preferably designed such that jacket segments 32 and web segments 36 are located at the same relative positions along the length of fiber optic cable 10 and have the same lengths.

Referring now to FIG. 3, an exemplary manufacturing line 40 for fabricating fiber optic cable 10 having support section 14 with intermittent jacket segments 32 is schematically depicted. In general terms, at least one optical fiber 16 and at least one strength member 30 are provided and jackets are extruded thereover to define cable section 12 including at least one optical fiber 16 and support section 14 including at least one strength member 30. In order to form fiber optic cable 10 depicted in FIGS. 1 and 2, buffer tube 18 in which optical fibers 16 are disposed is drawn from a pay-off 42, through a conventional dancer 44, around turning sheave 46, through an optional length counter 48 and a cable tensioning apparatus 50, such as a single wrap tensioning capstan, and around a turning sheave and load cell 52. Although not depicted in FIG. 3, strength members 24 and rip cords 28 can also be drawn from respective pay-offs and advanced alongside buffer tube 18 through the subsequent stages of manufacturing line 40. Moreover, manufacturing line 40 could also include one or more roll forming tables (not shown) for wrapping water blocking tape 22, corrugated tape armor or the like about buffer tube 18. For purposes of simplifying the following description of manufacturing line 40, however, reference will only be made to buffer tube 18 with it being understood that other components of cable section 12 could be wrapped about or extend alongside buffer tube 18, if so desired. Similar to the advancement of buffer tube 18 through initial portions of manufacturing line 40, strength members 30 are drawn from a pay-off 54, through a length counter 56 and a support tensioning apparatus 58, such as a multi-wrap tensioning capstan, and around turning sheave 52.

Upon exiting turning sheave 52, buffer tube 18 and strength members 30 pass through an extrusion cross head through which extrudate, such as a polyethylene, is extruded about buffer tube 18 and strength members 30 to define cable section 12 and support section 14, respectively, as well as web 36 that connects cable section 12 and support section 14. According to the present invention, the extrusion crosshead preferably extrudes extrudate about strength members 30 on an intermittent basis. For example, the extrusion crosshead may be designed, such as by including valves or the like, to periodically block or interrupt the extrudate that otherwise would form jacket 32 encapsulating strength members 30. Likewise, the extrusion crosshead preferably periodically blocks or interrupts the extrudate that otherwise would form web 36, preferably in a synchronous manner to the periodic interruption of the extrusion of jacket 32 about strength members 30. As such, extruder 60 intermittently extrudes jacket 32 and web 36 to thereby define jacket and web segments that are spaced apart in a lengthwise direction such that portions of strength members 30 are exposed therebetween. The extrusion crosshead is preferably designed to alternately extrude the extrudate about strength members 30 for a first period and then to block the extrudate that would otherwise have encapsulated strength members 30 and formed web 36 for a second period. In order to fabricate a fiber optic cable as shown in FIGS. 1 and 2 in which windows 34 are longer than jacket segments 32 in the lengthwise direction, the extrusion crosshead can be designed such that the second period is longer than the first period. In contrast to the intermittent extrusion of jacket 32 and web 36, extruder 60 preferably continuously extrudes jacket 26 about buffer tube 18.

According to the illustrated embodiment, the resulting fiber optic cable 10 is then preferably cooled in a trough 62 and water is removed by pressurized air. The outer diameter of fiber optic cable 10 can then be measured by a diameter gauge 66. Fiber optic cable 10 is then drawn through a cable tensioning apparatus 68 and wound onto a take-up reel 70. As described in detail in U.S. patent application Ser. No. 09/102,392, the contents of which are incorporated by reference in their entirety herein, fiber optic cable 10 is drawn through manufacturing line 40 by cable tensioning apparatus 68 that typically includes a pair of tensioners in the form of multi-wrap capstans driven by motors. If fiber optic cable 10 is to be manufactured to have an overlength with cable section 12 slightly longer than support section 14, the tensioning apparatuses 50, 58, 68 can be controlled such that support tensioning apparatus 58 runs at a slightly slower speed, such as about 0.2% slower, than cable section tensioning apparatus 50, thereby elongating support section 14 relative to cable section 12 prior to entering extruder 60. Upon releasing the tension from support section 14 and cable section 12, support section 14 will contract to a relaxed state such that cable section 12 will be physically longer than support section 14, thereby resulting in the overlength of cable section 12.

Although one example of manufacturing line 40 that is suitable for fabricating the embodiment of fiber optic cable 10 that is depicted in FIGS. 1 and 2 is described above and illustrated in FIG. 3, manufacturing line 40 of another embodiment is adapted to fabricate fiber optic cable 10 having a different type of cable section 12, such as a cable section 14 that includes a plurality of buffer tubes 18 helically wound about a central strength member. Moreover, manufacturing line 40 need not include all of the components depicted in FIG. 3, such as the various length counters and diameter gauges, so long as extruder 60 is adapted to intermittently extrude jacket segments 32 at locations spaced apart in a lengthwise direction along strength members 30 in order to fabricate fiber optic cable 10 of the present invention.

Fiber optic cable 10 of the present invention can be formed in a variety of sizes depending upon the anticipated application. In one exemplary embodiment in which cable and support sections 12, 14 both have a circular shape and cable section 12 includes a single, centrally disposed buffer tube 18 as shown in FIGS. 1 and 2, cable and support sections 12, 14 can be formed to have outer diameters of about 8.8 mm and about 12.8 mm, respectively. With respect to an exemplary cable section 12, for example, buffer tube 18 has a wall thickness of 0.8 mm with an interior diameter of 5.4 mm and an outer diameter of 7.0 mm. As such, polyethylene jacket 26 of cable section 12 has a thickness of about 2.9 mm. The strength member OD is about 1.75 mm. In addition, with respect to support section 14, strength members 30 are galvanized steel wires having a cumulative diameter of 6.4 mm such that each polyethylene jacket segments 32 of support section 14 have a thickness of about 1.4 mm. Each jacket segment 32 of this exemplary embodiment also has a longitudinal length of 5.5 cm, with a spacing of 57 cm between adjacent jacket segments. Fiber optic cable 10 of the exemplary embodiment also includes an intermittent web 36 formed of polyethylene and having web segments with a lateral width of about 1.5 mm and a height between the cable and support sections of 4.0 mm. Intermittent webs 36 of this embodiment are preferably monolithically formed with the segments, and are positioned at generally the same points along the length of fiber optic cable 10 as jacket segments 32 and, like jacket segments 32, have a longitudinal length of about 5.5 cm, with a spacing of about 57 cm between adjacent web segments.

As a result of its construction, fiber optic cable 10 of this particular embodiment is self-supporting for spans of up to 200 feet or more under heavy loading conditions as defined by the National Electric Safety Code (NESC). As will be apparent, fiber optic cables of the present invention can be designed in different manners with components having different thicknesses and sizes in order to be self-supporting for different spans without departing from the spirit and scope of the present invention.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. For example, cables according to the present invention can comprise slotted core type components, for example, as disclosed in U.S. Pat. No. 5,920,672.

That which is claimed:

1. A fiber optic cable comprising:
   a cable section comprising:
      at least one optical fiber; and
      a jacket surrounding the at least one optical fiber; and
   a support section comprising:
      at least one strength member extending in a lengthwise direction; and
      a jacket surrounding portions of said at least one strength member and connected to said jacket of said cable section, said jacket of said support section comprising a plurality of jacket segments spaced lengthwise along said at least one strength member, said plurality of jacket segments defining other portions of said at least one strength member between said plurality of jacket segments, said other portions having an at least partially exposed area, said at least partially exposed area excluding said jacket thereon.

2. A fiber optic cable according to claim 1 wherein each jacket segment has a length in the lengthwise direction, and wherein each pair of adjacent jacket segments are spaced apart by a distance greater than the length of either jacket segment.

3. A fiber optic cable according to claim 2 wherein said plurality of jacket segments are spaced lengthwise along said at least one strength member such that a ratio of the distance between each pair of adjacent jacket segments to the length of each jacket segment is at least about 10:1.

4. A fiber optic cable according to claim 1 further comprising a web connecting the respective jackets of said cable section and said support section.

5. A fiber optic cable according to claim 4 wherein said web comprises a plurality of web segments spaced apart in the lengthwise direction and connected to respective jacket segments.

6. A fiber optic cable according to claim 1 wherein said at least one strength member is comprised of a material that is generally environmentally stable.

7. A fiber optic cable according to claim 6 wherein said at least one strength member is comprised of galvanized steel.

8. A fiber optic cable comprising:
   a cable section comprising:
      at least one optical fiber; and
      a jacket surrounding the at least one optical fiber;
   a support section comprising:
      at least one strength member; and
      a jacket surrounding portions of said at least one strength member; and
   a web connecting the respective jackets of said cable section and said support section,
   wherein said web and said jacket of said support section comprise a plurality of web and jacket segments, respectively, disposed in a spaced relationship such that portions of said at least one strength member are at least partially exposed between said plurality of jacket segments.

9. A fiber optic cable according to claim 8 wherein the fiber optic cable is adapted to extend in a lengthwise direction, wherein each jacket segment has a length in the lengthwise direction, and wherein each pair of adjacent jacket segments are spaced apart by a distance greater than the length of either jacket segment.

10. A fiber optic cable according to claim 9 wherein said plurality of jacket segments are spaced apart in the lengthwise direction along said at least one strength member such that a ratio of the distance between each pair of adjacent jacket segments to the length of each jacket segment is at least about 10:1.

11. A fiber optic cable according to claim 9 wherein each web segment is connected to a respective jacket segment, and wherein each web segment has a length in the lengthwise direction that equals the length of the respective jacket segment.

12. A fiber optic cable according to claim 8 wherein said at least one strength member is comprised of a material that is environmentally stable.

13. A fiber optic cable according to claim 12 wherein said at least one strength member is comprised of galvanized steel.

14. A fiber optic cable comprising:
- a cable section having at least one optical fiber; and a jacket surrounding the at least one optical fiber;
- a support section having at least one strength member; and
- a jacket surrounding portions of said at least one strength member; and
- a web connecting the respective jackets of said cable section and said support section,
- said web and said jacket of said support section comprise a plurality of web and jacket segments disposed in a spaced relationship, between said plurality of web and jacket segments are a plurality of intervening portions of said jacket surrounding said at least one strength member,
- said jacket of said intervening portions having a non-uniform thickness.

* * * * *